US008878873B2

(12) United States Patent
Banerjee et al.

(10) Patent No.: US 8,878,873 B2
(45) Date of Patent: Nov. 4, 2014

(54) ENHANCED VISIBILITY OF AVATARS SATISFYING A PROFILE

(75) Inventors: Dwip N. Banerjee, Austin, TX (US); Aditya Mohan, Dublin (IE); Sandeep R. Patil, Maharashtra (IN); Dhaval K. Shah, Nadiad (IN)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 12/339,649

(22) Filed: Dec. 19, 2008

(65) Prior Publication Data

US 2010/0156909 A1     Jun. 24, 2010

(51) Int. Cl.
*G09G 5/00* (2006.01)
*A63F 13/30* (2014.01)
*G06Q 10/10* (2012.01)
*G06T 13/40* (2011.01)

(52) U.S. Cl.
CPC ............ *A63F 13/12* (2013.01); *A63F 2300/55* (2013.01); *G06T 13/40* (2013.01); *A63F 2300/5566* (2013.01); *G06Q 10/101* (2013.01); *A63F 2300/5553* (2013.01)
USPC ........... 345/633; 345/634; 345/440; 345/441; 345/442; 345/473; 345/474; 345/619; 345/440.1; 345/440.2

(58) Field of Classification Search
CPC ..... G06T 11/206; G06T 11/203; G06T 11/40; G06T 13/40; A63F 13/12; A63F 2300/5553; A63F 2300/5556; A63F 2300/55
USPC .......... 345/440–442, 473–474; 715/758–764; 715/706; 709/203–205; 34/440–442; 34/473–474
See application file for complete search history.

(56) References Cited

U.S. PATENT DOCUMENTS

| | | | |
|---|---|---|---|
| 5,761,662 A * | 6/1998 | Dasan ................................... 1/1 |
| 6,272,467 B1 | 8/2001 | Durand et al. |
| 6,385,619 B1 | 5/2002 | Eichstaedt et al. |
| 6,704,012 B1 * | 3/2004 | Lefave .......................... 345/440 |
| 7,158,907 B1 * | 1/2007 | Soldo ............................ 702/108 |
| 7,177,904 B1 | 2/2007 | Mathur et al. |
| 7,310,676 B2 | 12/2007 | Bourne |

(Continued)

OTHER PUBLICATIONS

Powell, Andy; Featured 3D Project: Virtual Worlds, Real Learning? Education in Second Life; 3DVisA Bulletin, Issue 3, 2007.

(Continued)

*Primary Examiner* — Jin-Cheng Wang
(74) *Attorney, Agent, or Firm* — Damion Josephs; Robert C. Rolnik (57) ABSTRACT

Disclosed is a computer implemented method, computer program product, and apparatus to decorate visible attributes of a rendered avatar. A server may collect a first user profile of a first avatar, the first user profile having at least one interest of a user. Next, the server may receive a location of the first avatar, wherein the location is associated with a view to at least a second avatar. The server can identify the second avatar among a group of avatars visible with respect to the first avatar. Further, the server may read a target profile of the second avatar then determine whether the second user profile satisfies a criterion based on the first user profile and the target profile. In addition, the server may render a modified rendered avatar to a client, responsive to the determination that the target profile satisfies the criterion.

17 Claims, 4 Drawing Sheets

(56) References Cited

U.S. PATENT DOCUMENTS

| | | | |
|---|---|---|---|
| 7,386,799 B1 * | 6/2008 | Clanton et al. | 715/758 |
| 7,401,098 B2 | 7/2008 | Baker | |
| 7,468,729 B1 * | 12/2008 | Levinson | 345/473 |
| 8,108,774 B2 * | 1/2012 | Finn et al. | 715/706 |
| 2003/0151760 A1 * | 8/2003 | Berndt et al. | 358/1.14 |
| 2005/0216558 A1 * | 9/2005 | Flesch et al. | 709/205 |
| 2006/0230165 A1 * | 10/2006 | Zimmer et al. | 709/230 |
| 2007/0113181 A1 * | 5/2007 | Blattner et al. | 715/706 |
| 2007/0198713 A1 * | 8/2007 | Tsao et al. | 709/225 |
| 2008/0030496 A1 * | 2/2008 | Lee et al. | 345/418 |
| 2008/0059570 A1 * | 3/2008 | Bill | 709/203 |
| 2008/0091692 A1 * | 4/2008 | Keith et al. | 707/100 |
| 2009/0177976 A1 * | 7/2009 | Bokor et al. | 715/753 |
| 2009/0259648 A1 * | 10/2009 | Bokor et al. | 707/5 |
| 2010/0020085 A1 * | 1/2010 | Bates et al. | 345/474 |
| 2010/0083148 A1 * | 4/2010 | Finn et al. | 715/764 |
| 2012/0158723 A1 * | 6/2012 | Wu et al. | 707/737 |

OTHER PUBLICATIONS

Brogden, William; Web Services and Second Life; http://searchsoa.techtarget.com/tip/0,289483,sed26_gci1255023,00.html; May 15, 2007.

* cited by examiner

ENHANCED VISIBILITY OF AVATARS SATISFYING A PROFILE

BACKGROUND OF THE INVENTION

1. Field of the Invention

The present invention relates generally to a computer implemented method, data processing system, and computer program product for decorating visible attributes of a rendered avatar. More specifically, the present invention relates to determining whether an avatar within a scene presented is associated with a profile of the user sufficiently to modify the rendered avatar.

2. Description of the Related Art

Computer servers reachable over the internet provide powerful tools for people of diverse backgrounds to meet in a virtual manner without the attendant costs associated with traveling. Consequently, people worldwide may meet at an environment orchestrated by a server. Each person or user may use a client computer to login to a session with the server. Depending on the sophistication of the server, each person may be provided a virtualized character or avatar to facilitate communications with other users.

The more sophisticated among these servers provide environments that more or less mimic the physics of the real world. These environments are called virtual universes. A virtual universe is a simulation of a real world environment to account for physical phenomena. Such physical phenomena can include light propagation as well as rules governing the collision of objects. Nevertheless, a virtual universe may suspend some of the usual rules of physics, for example, providing flight capability to objects that lack proper airfoils or other flight controls An avatar is an object that has at least one surface defined for display within a virtual universe. The avatar may be moved about at the control of a user, and may be associated with interests of a user, as well as biographical and biological features of a user. Nevertheless, the avatar may be fanciful and whimsical in nature, for example, the avatar may be defined to depict facial hair not present in the actual user. The avatar is viewable when rendered to a client having the required display and supporting hardware.

A virtual location or, simply, location is a position within a virtual universe. The location can include orientation information. A user who logs into a virtual universe is assigned a location. The location information can be provided to the user by the server transmitting rendering instructions to a client concerning how to represent a scene or view on a display of a client computer. A view is a range of three dimensional space in a virtual world that is amenable to being presented, at least in part, to a display in accordance with a user's avatar location and may be based on the attitude, pose or posture of the avatar. Views and avatar locations may be based on location data that is stored as Cartesian or polar coordinates. Each component part of an avatar, including items worn or manipulated by the avatar can have their respective locations as well as orientations stored and calculated within the server.

An avatar is important in two respects. The location of a user's avatar may determine whether and to what extent the server renders the user's avatar to the client computers operated by other users. In addition, the avatar's location, among other things, may determine the extent to which the server renders or displays the other avatars to the user's client computer. If an avatar's location is remote from other avatars, or otherwise obscured by objects, the avatar may not be rendered to a view of any client computer of any user.

A rendered avatar is an avatar that at least in part, is made visible on a computer display of a user. The rendered avatar may include the instructions for rendering the avatar as transmitted from a virtual universe host.

Within a virtual universe, it may be common for avatars to congregate and thus interact even if each user, associated with each avatar, has never met before, in the real world or otherwise. Like real-world environments, users in a virtual universe may have trouble finding a common topic of interest to discuss.

SUMMARY OF THE INVENTION

The present invention provides a computer implemented method, computer program product, and apparatus for decorating visible attributes of a rendered avatar. A server may collect a first user profile of a first avatar, the first user profile having at least one interest of a user. Next, the server may receive a location of the first avatar, wherein the location is associated with a view to at least a second avatar. The server can identify the second avatar among a group of avatars visible with respect to the first avatar. Further, the server may read a target profile of the second avatar then determine whether the second user profile satisfies a criterion based on the first user profile and the target profile. In addition, the server may render a modified rendered avatar to a client, responsive to the determination that the target profile satisfies the criterion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
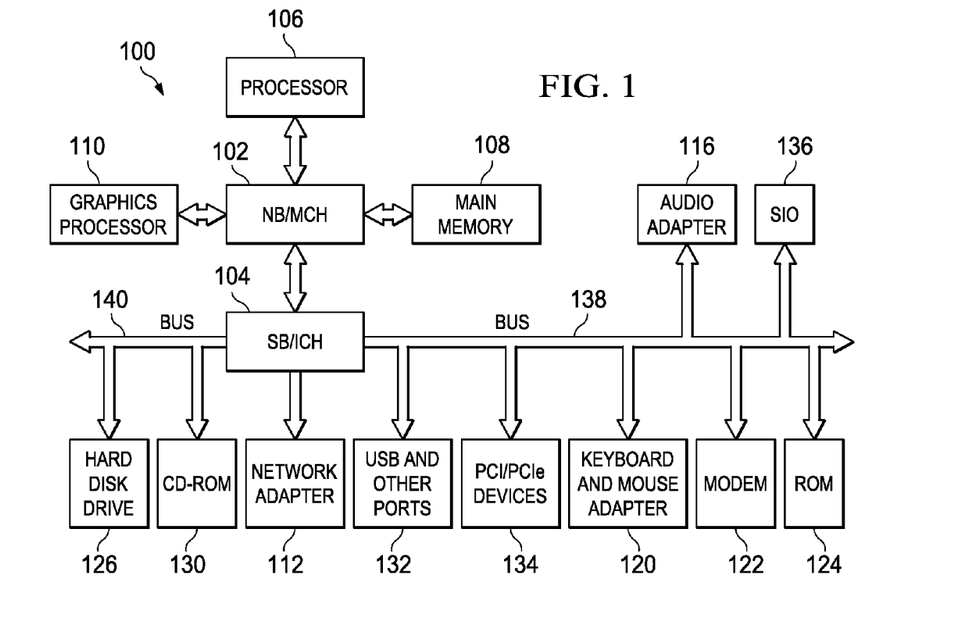
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
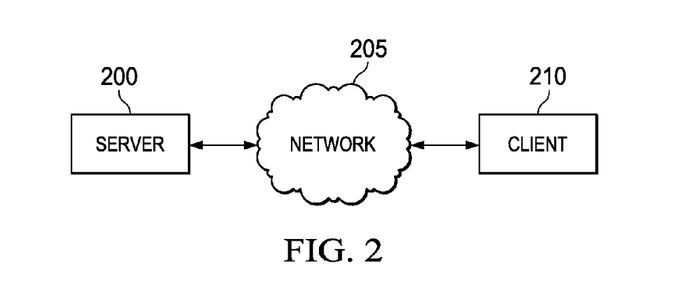
FIG. 2 shows a client computer interacting with a server hosting a virtual universe engine in accordance with an illustrative embodiment of the invention.

FIG. 2 shows a client computer interacting with a server hosting a virtual universe engine in accordance with an illustrative embodiment of the invention. Client computer 210 may use network 205 to transport packets and other signals concerning avatar the virtual universe. Network 205 may allow connection to server 200. It is appreciated that server 200 may be a federation of servers that coordinate access to virtual universe areas. Moreover, each server executes a virtual universe engine, which may be application software to manipulate and render avatars within the virtual universe.

The aspects of the illustrative embodiments provide a computer implemented method, data processing system, and computer program product for decorating visible attributes of avatars rendered within a view. Avatars that meet a criterion relevant to a user may be treated specially by a server. The server may send rendering instructions to the client computer to render avatars meeting the criterion in an emphasized manner or otherwise decorated with an additional feature. Thus, a user may visibly distinguish avatars associated with other users having common interests with the user, as opposed to avatars associated with other users having little in common with the user.

Figure 3:
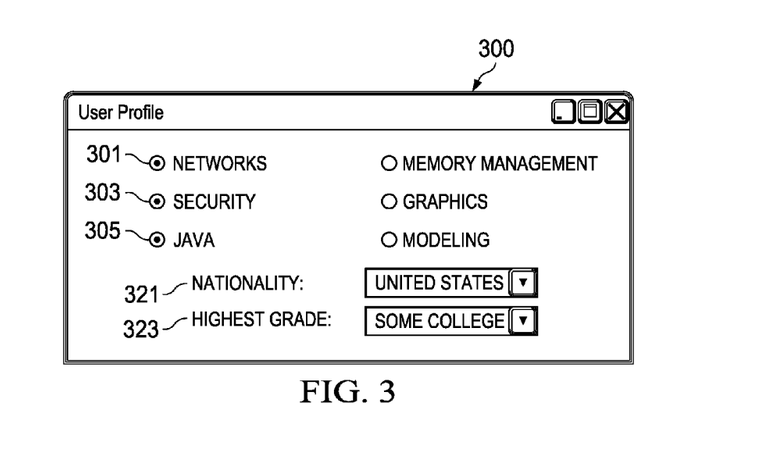
FIG. 3 shows a dialog box that a user may operate when logged in to a server in accordance with an illustrative embodiment of the invention.

FIG. 3 shows a dialog box that a user may operate when logged in to a server in accordance with an illustrative embodiment of the invention. Dialog box 300 may be presented by a server to the user's client computer. The dialog box may provide controls through which a user may add and modify interests and biographical details. The content stored and modified in this manner may be stored by the server for later evaluation as a user profile. A user profile is one or more criteria used to count and weight matches appearing within a target profile of a viewed or viewable avatar. A target profile is one or more files that indicate a user's interest. Interests may be identified by a user selecting user interfaces. The user interfaces may be radio buttons, pick lists, free-form text, and the like. For example, a user may select from dialog box 300, radio buttons for networks 301, security 303 and Java 305. In addition, a user may enter nationality 321, as well as education details 323. It is appreciated that among interests of a user, details may be obtained from text sourced from the user. In other words, such free-form text as resumes, blogs, and instant messaging sessions used in chats may be used as a corpus for detecting terms that a user frequently discusses. Accordingly, based on statistics from such a corpus, terms that appear at a higher frequency as compared to a term density in a population of generic, non-user-identified documents, may operate as terms with which to match for purposes of counting matches in interest of a second user to a the user.

The combination of interests directly entered by the user via dialog box 300 and the interests inferred from a corpus can form a user profile. A user profile is one or more criteria used to count and weight matches appearing within a target profile of a viewed or viewable avatar. The user profile can include interests of the user. An interest is a hobby, course of study, personal origin, profession, club, or any other activity, biographical detail and/or place associated with a user. A server may, as a term of service, or as some other prerequisite, require that a user establish a user profile as a condition of using the virtual universe. Accordingly, each avatar may have a user profile. Moreover, in relation to a user's profile, the illustrative embodiments of the invention may include other user's profiles as target profiles with which the user's profile may be matched such that the user can determine compatible virtual universe correspondents or users. Thus, a target profile is a profile of a user that is a candidate for matching interests with the current user. The user may be a candidate based on whether the user's avatar is within a distance and view of the first user.

Figure 4:
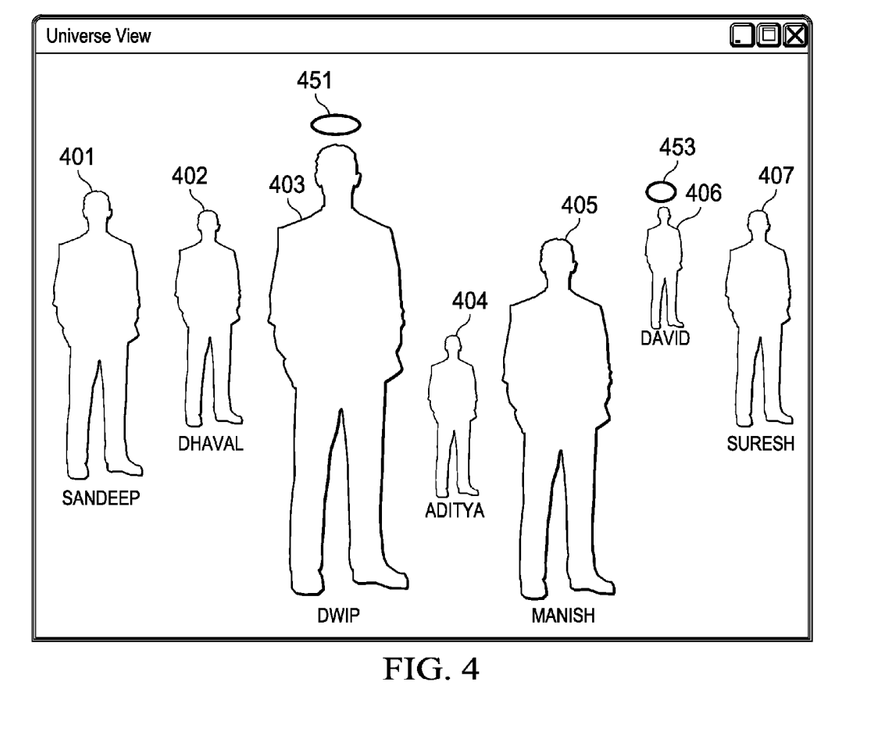
FIG. 4 is a view containing avatars in accordance with an illustrative embodiment of the invention.

FIG. 4 is a view containing avatars in accordance with an illustrative embodiment of the invention. FIG. 4 depicts avatars that may be presented in a three-dimensional perspective not dissimilar from first-person-shooter games. Avatars are presented to a user based on the location of the user's avatar, which may not be shown in a typical virtual universe. The client may receive instructions to render each avatar from a server, for example, server 200 of FIG. 2. Accordingly, the view, and changes to the view of FIG. 4, can include rendered avatars. A rendered avatar is a rendering of an avatar, in two dimensions or three dimensions. The rendering may be a transmittal of instructions concerning how to display an object to a computer screen. Moreover, the rendering step may include transmitting the instructions to a client computer that is remote from the source computer. Instructions may be Java instructions or other instructions that may be performed at the client computer to display objects to a computer display. Accordingly, a rendered avatar may be the instructions regarding how to depict the associated avatar.

A modified rendered avatar is a rendering of an avatar in two or three dimensions such that the avatar is rendered in a manner distinct from avatars that are not modified rendered avatars. A modified rendered avatar, may, for example, be an avatar rendered according to instructions that modify a normal ray-tracing algorithm to brighten pixels of the avatar on a client display more than pixels of avatar that is not a modified rendered avatar. The brightening may be of one element of the color spectrum, for example, an enhancing of red reflected from the simulated surface of the avatar. Alternatively, the modification may be to diminish a color reflected ray from a surface of an avatar. Still a further example, may be to alter normal physics of an avatar's volume and surfaces such that the simulation of light touching the avatar makes the modified rendered avatar appear transparent or translucent. Still another example of a modified rendered avatar is a rendering of the avatar with an additional feature or object not present in the inventor of objects that is associated with the avatar by the avatar's user.

As an example of this last form of modifying the rendering of an avatar, FIG. 4 may show avatars associated with users that are United States citizens as modified rendered avatars. For example, avatars associated with Dwip and David, avatar 403 and avatar 406, respectively, may include a decoration of a halo, halo 451 and halo 453, respectively. A decoration is an attribute or feature of a rendered avatar that is added or emphasized in some manner. The decoration can include, for example, a label or halo, among others.

FIG. 4, accordingly, can show a common interest or biographical detail to a user having a user profile that includes a nationality of "United States." In the example of FIG. 4, each modified rendered avatar is shown as an emphasized rendered avatar. An emphasized rendered avatar is an avatar having rendering instructions that emphasize a feature or attribute of the avatar or add a feature to the avatar. The added feature may be a halo, a label, or other distinguishing feature. The emphasizing of the avatar can be in relation to a group of one or more avatars that fail to meet the criterion in relation to the user's interests. It is appreciated that the emphasizing effect can be applied to an emphasized rendered avatar may be to enhance a color spectrum of the surfaces of the avatar, such as enhancing the color red. Accordingly, each pixel may be assigned colors that are red-hued as compared to the normal rendering of the avatar.

As an alternative to the rendering of avatars shown in FIG. 4, the avatars that do not meet the criterion may be rendered as de-emphasized rendered avatars. A de-emphasized rendered avatar is a modified rendered avatar that has pixels dimmed or made more transparent. Accordingly, such de-emphasized rendered avatars may be faded when presented to a client display, or at the extreme, made invisible in a scene where the usual physics or rendering rules would make such avatars visible.

Figure 5:
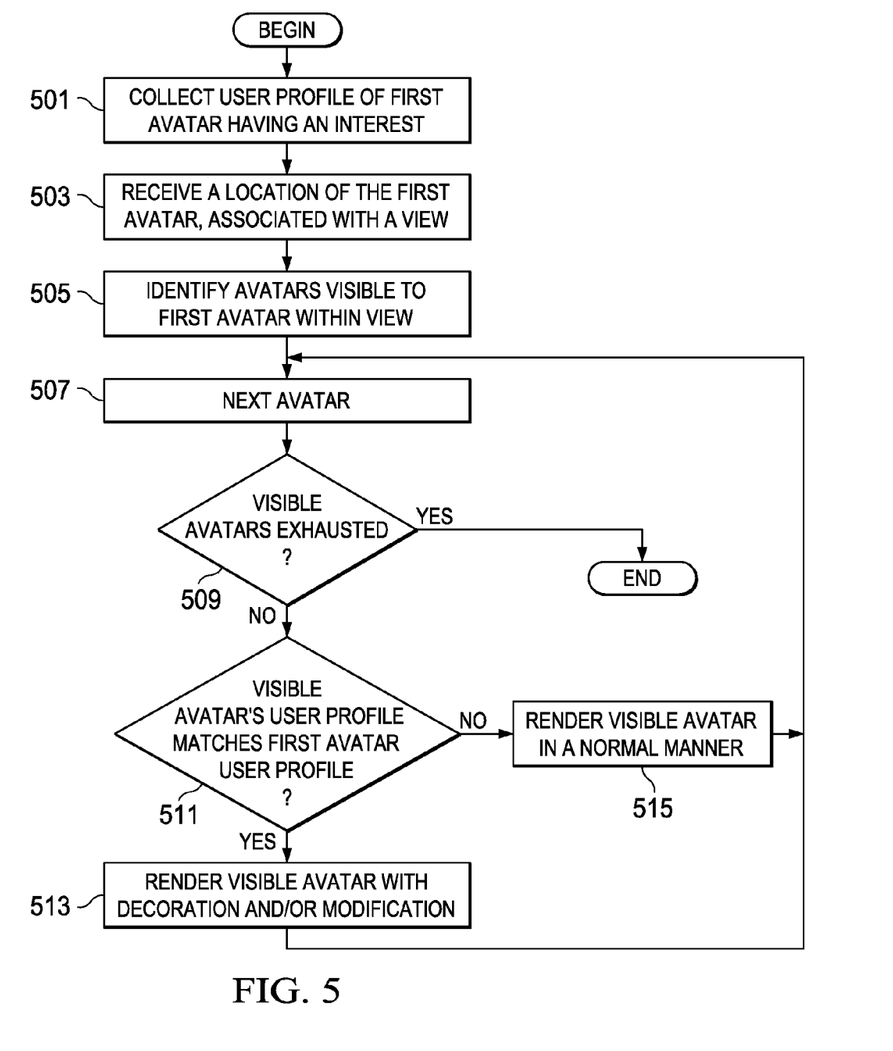
FIG. 5 is a flowchart of steps to render modified rendered avatars in accordance with an illustrative embodiment of the invention.

FIG. 5 is a flowchart of steps to render modified rendered avatars in accordance with an illustrative embodiment of the invention. Initially, a server may collect a user profile of a first avatar having an interest (step 501). Collection includes receiving the user profile or at least modifications to the user profile by a server. The collection may include a user entering data to a dialog box at a client, for example, client 210 of FIG. 2. Next, the server may receive a location of the first avatar associated with a view (step 503). The location, as explained above, is a virtual location, and the location may also be associated with a second avatar that is at a location amenable for rendering to a user of the first avatar.

The server may determine that the second avatar is amenable for rendering to the first user. Accordingly, next, the server may identify avatars visible to the first avatar within the view (step 505). Thus, using the example of FIG. 4, the server may determine that avatar 401, avatar 402, avatar 403, avatar 404, avatar 405, avatar 406 and avatar 407 are within a view to be rendered to a client display of a user's client. In addition, the server may determine that other avatars, not shown, are not in a direction faced by the user's avatar, or are obscured in some manner from view by the user's avatar location. Accordingly, the server may traverse the list of avatars identified at step 505. Next, the server may read a next avatar among identified avatars (step 507). When reading the next avatar, the server may read an associated target profile, as explained with respect to FIG. 3, above.

Next, the server determines if step 507 is successful, that is, whether visible avatars are exhausted (step 509). If the result of step 509 is positive, processing terminates thereafter.

However, a negative result to step 509 may cause the server to determine whether the visible avatar's user profile matches the first avatar user profile (step 511). In other words, the server determines if the target profile matches a criterion. A criterion can be a determination that the target user profile matches a percentage of the first user's profile, or greater. For example, if the number of interests in a user's profile is as shown in FIG. 3, or five, and the user selects that a minimum of 50% of interests must match with a target profile for the criterion to be met, then the percentage match of 50% is part of the criterion. The number of interests in the user's user profile is five because the user has five interests: networks, security, java, US nationality, and 'some college' is highest grade achieved. A percentage match is a threshold of matching criteria as compared to available matching criteria of a first user profile. In other words, the percentage match is the percentage of common interests that a target profile has with the viewing user's profile, as compared to the maximum possible matches to the viewing user's profile. In this example, a target profile having "networks," "security," and "java", alone, may match the user profile of FIG. 3, at a 60% level of matching interests. Accordingly, such a target profile satisfies a threshold of 50% matching of the user profile that forms the criterion in FIG. 3.

In addition to the criterion shown above, a secondary criterion may be applied, with a corresponding secondary emphasis supplied by the server for rendered avatars that meet the secondary criterion. For example, the criterion of matching 50% of the user profile may be the primary criterion, which the server can respond to by emphasizing avatars that have associated target profiles that meet the primary criterion by rendering such avatars with a red shade or filter to pixels. In addition, a secondary criterion may be applied to avatars associated with target profiles meeting a 75% percentage match such that the server renders the applicable avatars with a blue shade or filter to the pixels of such criterion-meeting avatars. Accordingly, in the scenario outlined above, some avatars in a group may be rendered normally; some avatars in the group may be rendered with a red shade; and still other avatars in the group may be rendered with a blue shade. In other words, the rule that a modification to shade avatars red may be superseded by a rule to shade an avatar blue when the correlation or matching of interests is at a particularly high level, as described by the secondary criterion.

A positive result to step 511 may cause the server to render the visible avatar with decoration and/or modification (step 513). In other words, the server, at step 513, can render the visible avatar as a modified rendered avatar. The modified rendered avatar may be an emphasized rendered avatar. Nevertheless, the user may have a preference to not meet or interact with avatars of a similar national background. Accordingly, in this scenario, the user may select that the modified rendered avatar be displayed as a de-emphasized rendered avatar. In such a circumstance, a user may widen his international contacts.

A negative outcome to step 511 may result in the server rendering the visible avatar in a normal manner (step 515). Following steps 513 and 515, the server may obtain a next avatar according to step 507. As explained above, the steps involving rendering may include the server transmitting instructions to the client concerning the manner in which to display an avatar to the client display. Processing terminates when all visible avatars are exhausted.

Figure 6:
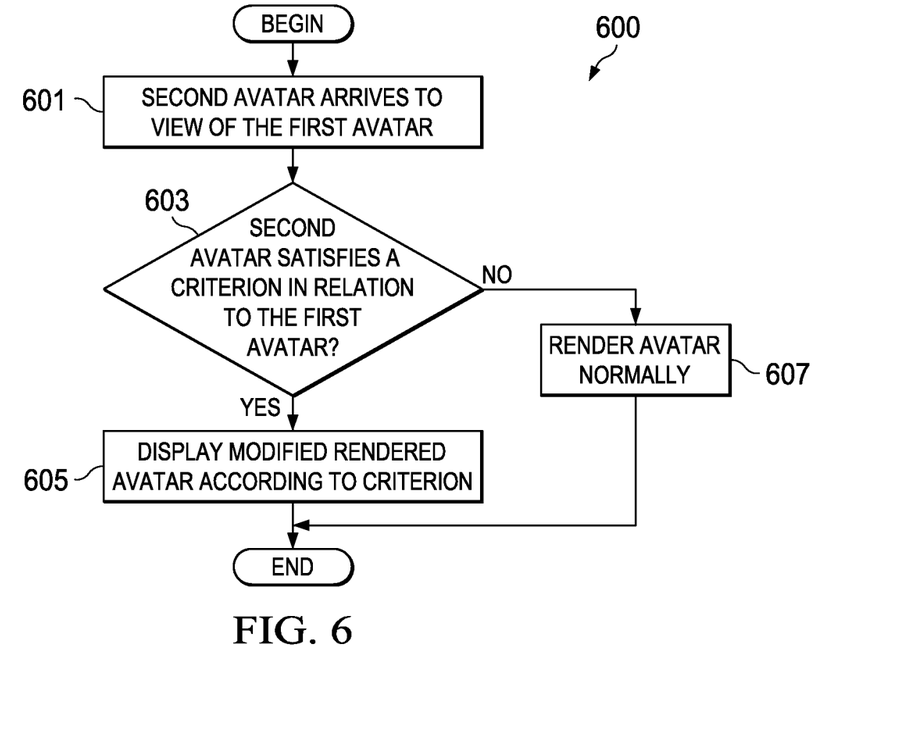
FIG. 6 is a flowchart that depicts how an avatar may arrive into a view of the first avatar in accordance with an illustrative embodiment of the invention.

FIG. 6 is a flowchart that depicts how an avatar may arrive into a view of the first avatar in accordance with an illustrative embodiment of the invention. Initially, the second avatar arrives to a view of the first avatar (step 601). In other words, the second avatar arrives to a location that is not obscured or otherwise inhibited from viewing by physics with relation to the first avatar. Next, the server determines if the second avatar satisfies a criterion in relation to the first avatar (step 603). A positive determination to step 603 may cause the server to display the avatar as a modified rendered avatar according to the criterion (step 605). In contrast, a negative determination to step 603 may cause the server to render the second avatar normally (step 607). After steps 605 and 607, processing terminates.

As an alternative to step 601, an alternative embodiment may receive a pointer hovering over the second avatar. Accordingly, in this alternative embodiment, step 603 may be responsive to a first user's pointer hovering over the second avatar in the view. In other words, the server, can receive a pointer input as an initial step to display a modified rendered avatar. In addition, in such an alternative embodiment, the server may render a more detailed set of emphasized pixels. For example, where the avatar does meet the criterion, modification at step 605 can be that the server renders the avatar is modified to include a list of matching interests in a label above the rendered avatar.

Still a further embodiment may involve a manipulation of the avatar of the user, for whom the view is displayed as a first-person point of view. Such a user is the viewing user. The viewing user may be endowed with the feature of receiving emphasized and de-emphasized renditions of peer avatars in response to donning or otherwise placing an object in contact with the viewing user's avatar. For example, features of flowchart 600 may be associated with an object, such as goggles, within the virtual universe. The viewing user's avatar may place the goggles on the avatar's head. Accordingly, such an action, placing specialty goggles on the avatar's head, may be an initiating step in place of step 601. Accordingly, the server, when instructed that the viewing user's avatar is wearing the goggles, may respond in the manner shown by steps 603, 605 and 607. Thus, when wearing the goggles, the viewing user's avatar is associated with a feature of discriminating between avatars having sufficient common interests and those avatars lacking sufficient common interests with the viewing user.

It is appreciated that the object that endows the avatar, and thus the user, with the feature of seeing emphasis among avatars of like-minded users may be triggered by any number of events. These events include, placing a hat object on the viewing avatar's head, wearing a glove object associated with the feature, or wearing any number of objects that are associated with the added functionality. The server can determine that such a specialty object is worn or otherwise engaged by the viewing user's avatar, and thus revise or modify rendering of avatars accordingly.

The illustrative embodiments permit a user to rapidly gather information concerning compatible or otherwise interesting users based on proximity to the associated avatars of the other users and similarities to their target profiles to criteria set by the user. Accordingly, interesting users may stand out from among a crowd of less interesting users, at least with respect to associated avatars of the other users within the virtual universe.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for decorating visible attributes of a rendered avatar, the method comprising:
    a server computer collecting a first user profile of a first avatar, the first user profile having at least one interest of a first user, and wherein the user profile is a text file;
    the server computer receiving a location of the first avatar, wherein the location is associated with a view of at least one second avatar;
    the server computer identifying the at least one second avatar among a group of avatars visible with respect to the first avatar;
    the server computer reading a target profile of the at least one second avatar; and
    receiving a pointer input hovering over the second avatar, and in response to receiving the pointer input hovering over the second avatar, showing a percentage match between the first user profile and the target profile.

2. The computer implemented method of claim 1, further comprising:
    responsive to receiving the location of the first avatar, the server computer determining whether a criterion is satisfied based on the first user profile and the target profile, wherein the criterion is specified by a second user; and
    responsive to the determination that the criterion is satisfied, the server computer rendering a modified rendered avatar to a client, wherein the modified rendered avatar is based on the first avatar, wherein the modified rendered avatar is an emphasized rendered avatar having a halo, and the criterion is that the target profile and the first user profile are sufficiently matched.

3. The computer implemented method of claim 2, wherein the criterion is based on at least one selected from a group of a blog and a chat associated with a target profile.

4. The computer implemented method of claim 3, wherein the emphasized rendered avatar is an enhancement of color of the rendered avatar.

5. The computer implemented method of claim 1, wherein the modified rendered avatar is a de-emphasized rendered avatar, and the criterion is that the target profile and the first user profile are not sufficiently matched.

6. The computer implemented method of claim 5, wherein the de-emphasized rendered avatar is increased transparency.

7. A computer program product for decorating visible attributes of a rendered avatar, the computer program product comprising: a computer usable tangible storage device having computer usable program code embodied therewith, the computer program product comprising:
    computer usable program code configured to collect a first user profile of a first avatar, the first user profile having at least one interest of a user;
    computer usable program code configured to receive a location of the first avatar, wherein the location is associated with a view of at least one second avatar, and wherein the view is a first person shooter view;
    computer usable program code configured to identify the at least one second avatar among a group of avatars visible with respect to the first avatar;
    computer usable program code configured to read a target profile of the at least one second avatar;
    computer usable program code configured to receive a pointer input hovering over the second avatar, and in response to receiving the pointer input hovering over the first avatar, showing a percentage match between the first user profile and the target profile.

8. The computer program product of claim 7, wherein the computer program product further comprises:
    computer usable program code to determine whether a criterion is satisfied based on the first user profile and the target profile, wherein the criterion is specified by a second user, in response to receiving the location of the first avatar; and in response render a modified rendered avatar to a client, wherein the modified rendered avatar is based on the first avatar, wherein the modified rendered avatar is an emphasized rendered avatar having a halo, and the criterion is that the target profile and the first user profile are sufficiently matched.

9. The computer program product of claim 8, wherein the criterion is based on a blog and chat.

10. The computer program product of claim 9, wherein the emphasized rendered avatar is an enhancement of color of the rendered avatar.

11. The computer program product of claim 7, wherein the modified rendered avatar is a de-emphasized rendered avatar, and the criterion is that the target profile and the first user profile are not sufficiently matched and the de-emphasized rendered avatar is increased transparency.

12. A data processing system comprising:
    a bus;
    a storage device connected to the bus, wherein computer usable code is located in the storage device;
    a communication unit connected to the bus; and
    a processing unit connected to the bus, wherein the processing unit executes the computer usable code to decorate visible attributes of a rendered avatar, wherein the processing unit executes the computer usable program code to collect a first user profile of a first avatar, the first user profile having at least one interest of a first user, and wherein the interest is derived from a corpus authored by the first user; receive a location of the first avatar, wherein the location is associated with a view of at least one second avatar; identify the at least one second avatar among a group of avatars visible with respect to first avatar; read a target profile of the at least one second avatar; determine whether a criterion is satisfied based on the first user profile and the target profile, responsive to receiving the location of the first avatar, wherein the criterion is specified by a second user; and render a modified rendered avatar to a client, responsive to the determination that the criterion is satisfied, wherein the modified rendered avatar is an emphasized rendered avatar having a halo and is based on the first avatar.

13. The data processing system of claim 12, wherein the modified rendered avatar is an emphasized rendered avatar, and the criterion is that the target profile and the first user profile are sufficiently matched.

14. The data processing system of claim 13, wherein the criterion is based on a blog and chat.

15. The data processing system of claim 14, wherein the emphasized rendered avatar is an enhancement of color of the rendered avatar.

16. The data processing system of claim 15, wherein the processor further executes computer usable code to receive a pointer input hovering over the first avatar, and show a percentage match in response to satisfying the criterion.

17. The data processing system of claim 12, wherein the modified rendered avatar is a de-emphasized rendered avatar, and the criterion is that the target profile and the first user profile are not sufficiently matched.

* * * * *